(12) United States Patent
Palm et al.

(10) Patent No.: US 6,414,709 B1
(45) Date of Patent: Jul. 2, 2002

(54) METHODS AND APPARATUS FOR ZOOMING DURING CAPTURE AND REPRODUCTION OF 3-DIMENSIONAL IMAGES

(75) Inventors: Charles S. Palm; Raymond McLaine, both of Westlake Village, CA (US)

(73) Assignee: Synthonics Incorporated, Westlake Village, CA (US)

( * ) Notice: Subject to any disclaimer, the term of this patent is extended or adjusted under 35 U.S.C. 154(b) by 0 days.

(21) Appl. No.: 08/483,552

(22) Filed: Jun. 7, 1995

Related U.S. Application Data (63) Continuation-in-part of application No. 08/339,156, filed on Nov. 10, 1994, now abandoned, and a continuation-in-part of application No. 08/335,381, filed on Nov. 3, 1994, now abandoned.

(51) Int. Cl.7 .......................... H04N 13/02; H04N 15/00
(52) U.S. Cl. .......................................... 348/47; 348/213
(58) Field of Search ............................ 348/47, 213, 48, 348/43, 42, 46; H04N 13/02, 15/00

(56) References Cited

U.S. PATENT DOCUMENTS

| | | | | |
|---|---|---|---|---|
| 4,562,463 A | * | 12/1985 | Lipton .......................... | 358/88 |
| 4,734,756 A | * | 3/1988 | Butterfield et al. ............ | 358/3 |
| 4,751,570 A | * | 6/1988 | Robinson ..................... | 358/88 |
| 4,805,015 A | * | 2/1989 | Copeland ..................... | 358/88 |
| 4,881,122 A | * | 11/1989 | Murakami ................... | 358/88 |
| 5,140,415 A | * | 8/1992 | Choquet ....................... | 358/88 |
| 5,175,616 A | * | 12/1992 | Milgram et al. .............. | 358/88 |
| 5,179,441 A | * | 1/1993 | Anderson et al. ............. | 358/88 |
| 5,223,925 A | * | 6/1993 | Hattori ......................... | 358/88 |
| 5,359,362 A | * | 10/1994 | Lewis et al. .................. | 348/15 |
| 5,417,210 A | * | 5/1995 | Funda et al. ............. | 128/653.1 |
| 5,473,364 A | * | 12/1995 | Burt ............................ | 348/47 |

* cited by examiner

*Primary Examiner*—Vincent Boccio
(74) *Attorney, Agent, or Firm*—McDermott, Will & Emery (57) ABSTRACT

In the capture and display of three dimensional images, techniques are provided for controlling the amount of disparity between left and right images used to create a three dimensional representation to permit three dimensional perception which would otherwise be lost as disparity increased beyond psychological and physiological limits. Both mechanical and electronic means for controlling disparity are shown. Techniques are disclosed for creating three dimensional animations which utilize disparity control for adjusting the perceived depth of an object vis-a-vis a neutral plane. When zooming in on an object with a stereo camera pair, the shift in focal length accompanying the zoom is accompanied by a simultaneous shift in disparity so that the stereo effect is not lost when a target object is very close, a moderate distance, or very far from the cameras. Camera separation is changed as a function of target distance to maintain a fixed fraction of the target distance as a default. The default can be overridden by adjusting disparity independently of the default. Personal discomfort which often accompanies viewing of stereo images is reduced by maintaining camera axes parallel so that unnecessary vertical shift is minimized or eliminated.

15 Claims, 11 Drawing Sheets

METHODS AND APPARATUS FOR ZOOMING DURING CAPTURE AND REPRODUCTION OF 3-DIMENSIONAL IMAGES

CROSS REFERENCE TO RELATED APPLICATIONS

This is a Continuation-in-Part of application Ser. No. 08/339,156 which was filed Nov. 10, 1994 by inventors Charles S. Palm and Raymond McLaine now abandonded.

This application is a continuation in part of application Ser. No. 08/335,381 by the same inventors, filed Nov. 3, 1994, titled METHOD AND APPARATUS FOR THE CREATION AND TRANSMISSION OF 3-DIMENSIONAL IMAGES, the contents of which are hereby incorporated by reference now abandoned.

This application is also related to application Ser. No. 08/318,047, filed Oct. 10, 1994, titled METHOD AND APPARATUS FOR INTERACTIVE IMAGE CORRELATION FOR THREE DIMENSIONAL IMAGE PRODUCTION the contents of which are hereby incorporated by reference.

This application is also related to application Ser. No. 08/327,471, filed Oct. 21, 1994, titled METHODS AND APPARATUS FOR RAPIDLY RENDERING PHOTOREALISTIC SURFACE ON 3-DIMENSIONAL WIRE FRAMES AUTOMATICALLY the contents of which are hereby incorporated by reference.

BACKGROUND OF THE INVENTION

When capturing and reproducing 3-dimensional images in the prior art, information from one camera of a stereo pair of cameras was depicted as one color (e.g. orange) or band of colors and information from the other camera of the pair was depicted in a complimentary color or color band. When viewing such images through 3-dimensional viewers, such as red/blue glasses, the reproduced image would not be perceived in color.

The orange elements in the picture are only seen through the blue lens, the red lens "washing out" the orange elements. For the same reason, the green-blue elements are only seen through the red lens. Hence, each eye sees only one of the two colored pictures. But because the different colored elements are horizontally shifted in varying amounts, the viewer's eyes must turn inward to properly view some elements, and turn outward to properly view others. Those elements for which the eyes turn inward, which is what the viewer does to observe a close object, are naturally perceived as close to the viewer. Elements for which the viewer's eyes turn outward are correspondingly perceived as distant. Specifically, if the blue lens covers the viewer's right eye, as is generally conventional, then any blue-green element shifted to the left of its corresponding orange element appears to the viewer as close. The element appears closer the greater the leftward shift. Conversely, as a green-blue element is shifted only slightly leftward, not at all, or even to the right of its corresponding red element, that element will appear increasingly more distant from the viewer.

The above mentioned co-pending applications teach techniques for producing color 3-dimensional images.

When 3-dimensional images are captured, corresponding points of the left image are displaced from the same points in the right image horizontally. A measurement of the amount of displacement is called "disparity". In the prior art when stereo images are made, the disparity for all subject matter visible in both images is fixed. In digital images, disparity can be measured in terms of the number of pixels an object is displaced in the right image relative to its position in the left image. Fixed focal length lenses are customarily used for the cameras.

In an object with zero disparity, the corresponding pixels for the left and right images are perfectly superimposed and the object appears to be located on the screen. Zero disparity objects are seen most clearly when the eyes are crossed just enough to focus on the plane of the screen. Negative disparity objects appear to come out of screen toward the viewer and are seen most clearly when the eyes are more crossed. Positive disparity objects appear to be more distant than the screen and are seen most clearly when the eyes are less crossed.

The eyes cross or uncross in order to get similar image features on or near the fovea of each eye. The "farthest" object that can be seen in an anaglyph is limited by the observers ability to comfortably uncross the eyes. (The usual limit to distant viewing is set by the condition where the eyes look along parallel axes, but such "wall-eyed" condition is rarely comfortable to the observer.)

In an anaglyph, the disparity for all objects is fixed and is measured in terms of pixels of displacement.

When one "zooms-in" on a computer image to see more detail, the pixels get larger and the center-to-center spacing between pixels becomes larger. Therefore, constant disparity (measured in pixels) image components become physically farther apart on the screen. In order for the human visual system to fuse image components and produce the sensation of true stereo vision the eyes have to uncross more for each step of "zoom-in". Eventually, the physical separation between corresponding image components becomes so great that the eyes cannot "uncross" comfortably any more (wall-eyed condition) and stereo depth is lost to the observer.

Some stereo images cover such a great range of depth and will have such widely varying values (even without a "zoom-in") that some portions of the image will always be out of range of the observer's ability to see the stereo effects, regardless of how the anaglyph was formed.

Three dimensional techniques are closely related to the psychology and physiology of an observer's cognitive processes. Subtle changes in selection of portions of the spectrum presented to each eye can result in significant changes in the observer's perception. Even when viewing the same 3-dimensional image through the same viewers, different observers may perceive a 3-dimensional image in different ways.

The depth location of the point at which the left and right image points for objects at that distance coincided constitutes a "neutral plane" and when observing a fixed disparity 3-dimensional image, the neutral plane would be found at the surface of the medium of reproduction (i.e. paper or CRT display). Items that appear closer than the medium surface and those points in the image which appear behind the neutral plane would have different disparity. The loss of depth perception when disparity exceeds a certain value generally means that when zooming-in on part of a stereo image pair that disparity will become so great that depth perception will be lost. This is a serious drawback when, for example, attempting to use medical images captured in stereo for instructional purposes. Typically, one would need to examine parts of an object in detail by going close up. This problem is analogous to having a fixed focal length microscope and being unable to see close up features which do not lie directly in the focal plane.

Also in the prior art, when capturing 3-dimensional images on film, magnetic tape or the like, there is no way to visually monitor the combined impact of the separate images being captured. As a result there is no way of adjusting disparity or automatically tracking an object and adjusting disparity automatically.

In the prior art, there is no way to control an image so as to position it either in front of or behind a neutral plane in a controllable fashion. This limits the ability to create 3-dimensional animations.

Also in the prior art, there was no way to adjust the views of 3-dimensional images captured on a static medium, such as CD/ROM.

In the prior art, when viewing stereo images, particularly for extended periods of time, viewers experience a certain amount of discomfort, such as eye strain and headaches. It would be desirable to minimize or eliminate such discomfort.

In the process of zooming in upon an object using stereo cameras, to avoid a loss of stereo effect as disparity exceeds the limits of the human mind to fuse the two images together into a 3-dimensional view, in the prior art cameras were "toed in" toward the object being zoomed upon. The inventors have recognized that this produces certain undesirable results which should be avoided.

When using cameras fixed as to separation and orientation, for scenes that are too far away there may be too little and for scenes too close there may be too much disparity leading to a loss of stereo effect. This, too, is undesirable.

The prior art lacked the ability to zoom-in on portions of a scene when capturing the scene from one location. In order to zoom-in on a scene in the prior art, a stereo camera pair with fixed focal length had to be physically relocated closer to the object being captured.

DISCLOSURE OF THE INVENTION

One advantage of the invention is that it allows for controlling disparity when capturing or reproducing an image.

Another advantage of the invention is that it permits a user to control the disparity by which left and right images are separated.

Another advantage of the invention is the simultaneous adjustment of focal length in stereo camera pairs.

Another advantage of the invention is the ability to adjust camera separation or camera toe-in.

Another advantage of the invention is that it permits zooming-in on portions of a stereo image without losing depth perception.

Another advantage of the invention is the ability to control the location of the neutral plane in 3-dimensional views, thus enabling objects to be controllably placed in front of the neutral plane (popping out of the screen) or behind the neutral plane (in background).

Another advantage of the invention is the ability to create a computer animation using disparity control to produce very realistic animations which move in front of and behind the neutral plane.

Another advantage of the invention is a reduction in the amount of personal discomfort experienced when viewing stereo images. The inventors have discovered that the amount of vertical shift between corresponding points on left and right images can cause discomfort such as eye strain and headaches as one eye tries to move upward vis-a-vis the other to fuse the corresponding points into a stereo image.

Another advantage of the invention is that cameras can be maintained in a parallel orientation without undesirable vertical shift caused by "toe in" of two cameras in an attempt to compensate for exceeding the disparity limits tolerated by the human brain for fusing a stereo image.

Another advantage of the invention has to do with preventing the loss of stereo effect when distances are so far that there is too little disparity for the stereo effect or are too close so that there is too much disparity for the stereo effect.

These and other objects and advantages of the invention are achieved by providing methods and apparatus for viewing three dimensional images which shift one image view with respect to an other image view to control the amount of disparity between corresponding points of the two views and displays the image views so as to form a three dimensional image. The shifting of one image view with respect to another is accomplished by cropping two image planes at different ends by the amount of a desired disparity shift and then combining the cropped image planes to produce a three dimensional display. The shifting can also be accomplished by limiting the read out of certain addresses of each line of video memory image information using a shift register to receiving a line of image data and selecting which cell of the shift register is used for shifting the contents of the shift register to an output.

The invention is also directed to apparatus for capturing and storing three dimensional images using a left camera and a right camera, each with a zoom lens. The zoom lenses are controlled so that each camera zooms substantially identical amounts when zooming is used.

The invention also relates to apparatus for mechanically controlling disparity of images captured by two different cameras, and storing those images. One camera is movably mounted for controlled movement with respect to the other, such as toe-in or horizontal offset.

The invention is further directed to an apparatus for zooming on a scene using a three dimensional camera arrangement with each camera having a zoom lens. The zoom lenses are controlled with servomechanism so that each zoom lens zooms the same amount. A number of coding indications may be used to control the amount of zoom.

The inventions is further directed to apparatus for producing three dimensional images captured using a left and a right video camera connected to respective left and right video recorders. Images from the left and right video recorders are synchronized with each other. The output of the left video recorder is filtered to eliminate blue and green information and the output of the right video recorder is filtered to eliminate the red information. The two outputs are combined to produce a three dimensional image.

The inventions is also directed to reproducing a three dimensional image from first and second digital images stored on a storage medium such as CD/ROM. The first and second digital images are both decomposed into red, green and blue color planes. One color plane of the first digital image is shifted with respect to other color planes of said second digital image and the shifted color plane of the first digital image is combined with the other color planes to produce a three dimensional image.

The invention also contemplates a method of live monitoring of three dimensional images being captured by first and second cameras to a storage medium separating the output of each camera into color planes, combining one color plane of said first camera with one or more different color planes from said second camera; and by displaying the combined color planes.

The invention also contemplates a method of automatically adjusting an image parameter such as disparity during creation of a reproduction of a live scene by placing a small, highly reflective material on a target to be tracked, illuminating said highly reflective material, using the bright spot created by reflection from said highly reflective material for calculating target position and by adjusting said image parameter based on the calculated target position. The image parameter can also be focus or zoom.

The invention is also directed to a method of moving the apparent position of an object represented as left and right images which together constitute a three dimensional image viewed by a viewer to make the object appear to move toward the viewer or recede away from the viewer by shifting the position of the left and right images to change the disparity between the left and right images to thereby cause the perceived relative positions of the object to move The invention also permits creating a three dimensional computer generated animation of an object by representing said object as a three dimensional wire frame, rendering a surface on said wireframe, creating two color perspective views of said rendered wireframe, separating each of said two color perspective views of said rendered wireframe into 3 color planes, combining one color plane from one of said views with two other color planes from the other view, storing the combined color planes as a three dimensional image, moving said object by modifying said wire frame; and repeating the steps for as many iterations as desired and then displaying sequentially each three dimensional images stored as a three dimensional animation.

In one aspect, the invention is directed to apparatus for capturing three dimensional stereo images of a scene using a left camera and a right camera with parallel optical axes and with a mechanism for maintaining spacing between the cameras at a fixed fraction of a distance to a targeted object. The fixed fraction is a default value which can be overridden by manual adjustment.

The invention is also directed to apparatus for capturing three dimensional stereo images of a scene using a left camera and a right camera with substantially parallel optical axes, and substantially identical zoom lenses. Disparity is adjusted while adjusting focal length of the zoom lenses to hold a location of the neutral plane substantially constant and/or to avoid loss of stereo effect.

The invention is also directed to a method of maintaining disparity of a stereo pair of images within a range which avoids a loss of stereo effect without camera toe in while avoiding vertical shift between corresponding points of a left view and a right view of said stereo pair by maintaining the optical axes of a left camera and of a right camera substantially parallel, and by adjusting disparity while adjusting distance to a target object to avoid loss of stereo effect.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects all without departing from the invention. Accordingly, the drawings and description are to be regarded as illustrative in nature and not as restrictive.

BEST MODE FOR CARRYING OUT THE INVENTION

The invention is based in part upon the inventors' realization that, when viewing 3-dimensional images, a loss of depth perception ensued when zooming-in on portions of the image. Subsequent work indicated that many of the problems related to the issue of disparity. As noted above, disparity is a measure of the amount of displacement between corresponding points of an image presented to the left eye via a vis points on an image presented to the right eye. This is illustrated in FIG. 1.

Figure 1:
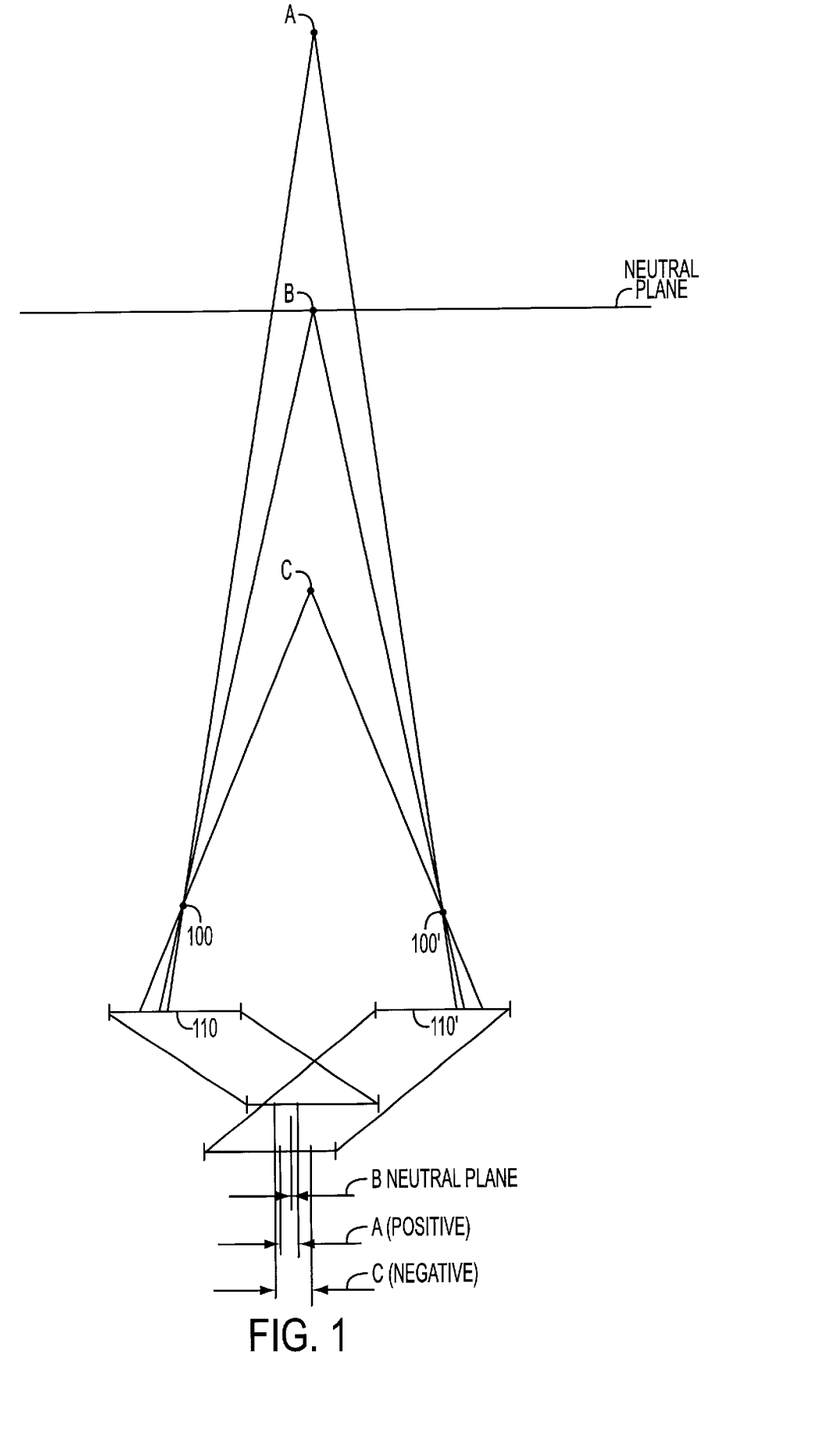
FIG. 1 is an illustration of disparity variations as a function of distance from the neutral plane.

In FIG. 1, a neutral plane is defined as running through point B. Point A is located behind the neutral plane and point C is located in front of the neutral plane when viewed from focal points 100 and 100'. The projection of points A, B and C through the respective focal points onto focal planes 110 and 110' results in points $A_L$, $B_L$, $C_L$, $A_R$, $B_R$ and $C_R$. Focal planes 110 and 110' are shown transposed so as to be vertically disposed with respect to each other. The distance between the image of points A, B and C on the left image plane and points A, B and C on the right image plane are illustrated. The measure of the distances A, B and C shown beneath the vertically aligned focal planes is measure of the disparity. As can be seen in FIG. 1, the further a point is from the neutral plane, the greater the disparity is.

At some point, the disparity becomes so great that a viewer is incapable of recognizing the depth information and fusing the two images into a single 3-dimensional view. As a point regresses further behind the neutral plane, the angular difference between points separated by a unit distance becomes progressively less and so a big difference in depth will result in a smaller angular displacement on the focal planes on which points far behind the neutral plane are projected. This results in a loss of depth detail at far distances behind the neutral plane.

The inventors have discovered that both of these problems can be overcome by allowing the user to control or adjust the amount of disparity between corresponding points on the two image planes. This principle is applicable to all stereo viewing systems and not just to those using color viewers.

For example, if distance B shown at the bottom of FIG. 1 represents the amount of disparity at a neutral plane, and if the amount of disparity shown at C was so great as to result in a loss of depth perception, depth perception can be restored by shifting image plane 110 vis-a-vis image plane 110' so that the distance C between corresponding points is reduced to that of distance B, i.e. to a position on the neutral plane.

Figure 2:
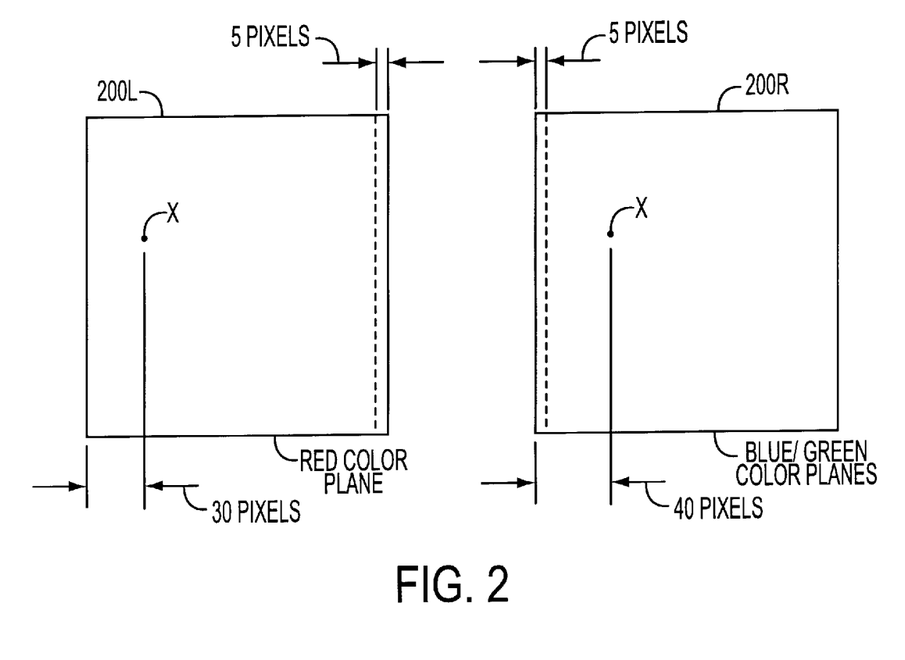
FIG. 2 shows the cropping of two image planes to vary the amount of disparity.

FIG. 2 shows at a high level how this may be done. FIG. 2 illustrates two color video images 200L and 200R which were captured by left and right digital cameras, such as video cameras or digital still cameras. In creating three dimensional images, it is convenient to utilize, as set forth in the above patent application Ser. No. 08/335,381, filed Nov. 3, 1994 separation of left and right images into color planes as shown. Image 200L constitutes the red color plane from the left camera and 200R constitutes the blue and green color planes from the right camera. When combined, into a three color plane representation, three dimensional images are produced and are viewable using standard red-blue viewers. This particular technique preserves color information as indicated in the aforesaid co-pending application. As shown in FIG. 2, the left and right views of point X are located 30 and 40 pixels displaced from the left edge of the image as indicated. There is thus a 10 pixel disparity between the position of the left and right points. By shifting the color planes so that the image 200R is displaced 5 pixels to the left and by shifting the image 200L 5 pixels to the right, the two views of point X will exactly coincide or, in other words, point X will lie in the neutral plane when viewed. FIG. 2 illustrates that the shifting is accomplished by truncating the image by 5 pixel s on the left side of image 200R and by 5 pixels on the right side of 200L. Although not required, this is done because some image processing packages require that both images be of the same size in order to combine them.

Figure 3:
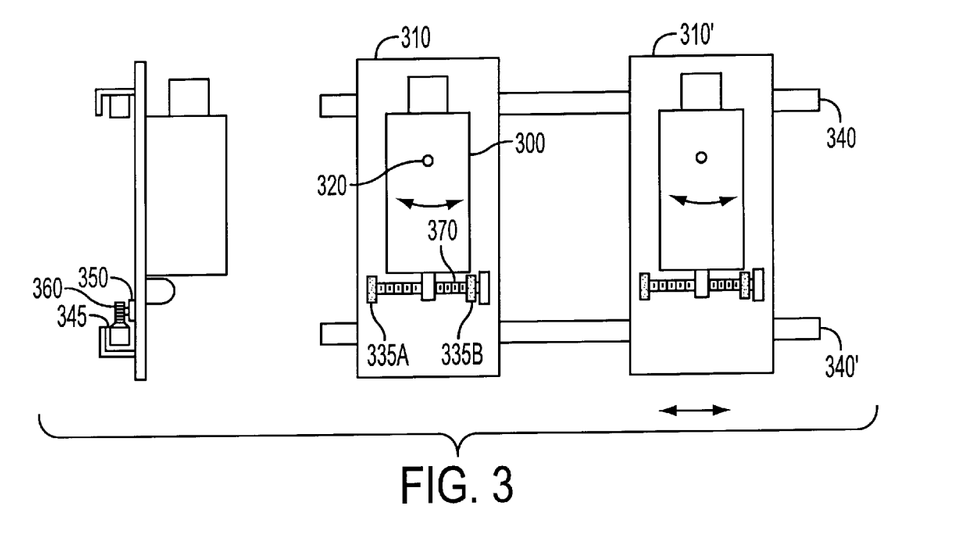
FIG. 3 illustrates two cameras used for capturing 3-dimensional images which are adjustable to control tow-in or horizontal displacement from each other.

Disparity adjustment may occur manually. FIG. 3 illustrates two different ways in which disparity adjustment can occur.

Disparity can be adjusted by changing the toe-in angle between the two cameras 300 and 300'. Each camera is illustrated as being mounted on a pivot point 320 or 320' and the angular orientation of a camera is adjusted by screwdrive 330 which moves the rear end of the camera vis-a-vis points 335A and 335B. Even if this were not required for disparity adjustment, it would be a useful mounting for ensuring parallel alignment of the two cameras.

The other method involves changing the separation of the cameras 300 and 300' by moving one with respect to the other along rails 340 and 340'. As shown in the left hand view of FIG. 3, the inner part of rail of 340' has teeth 345 which constitute part of a rack-and-pinion drive. The pinion 360 is driven by servo motor 350 to permit the entire platform to move vis-a-vis the other camera.

In the prior art, three dimensional cameras utilized fixed focal length lenses. That is, the focal length could not vary to permit a zooming function. This is somewhat inflexible since in standard movie or video making, zooming is a very convenient tool for the camera man. If one image of a stereo image pair were larger than the other by virtue of different settings of a zoom lens, image offsets would occur which would interfere with human perception of depth, and thus the stereoscopic effect would be lost.

Figure 4:
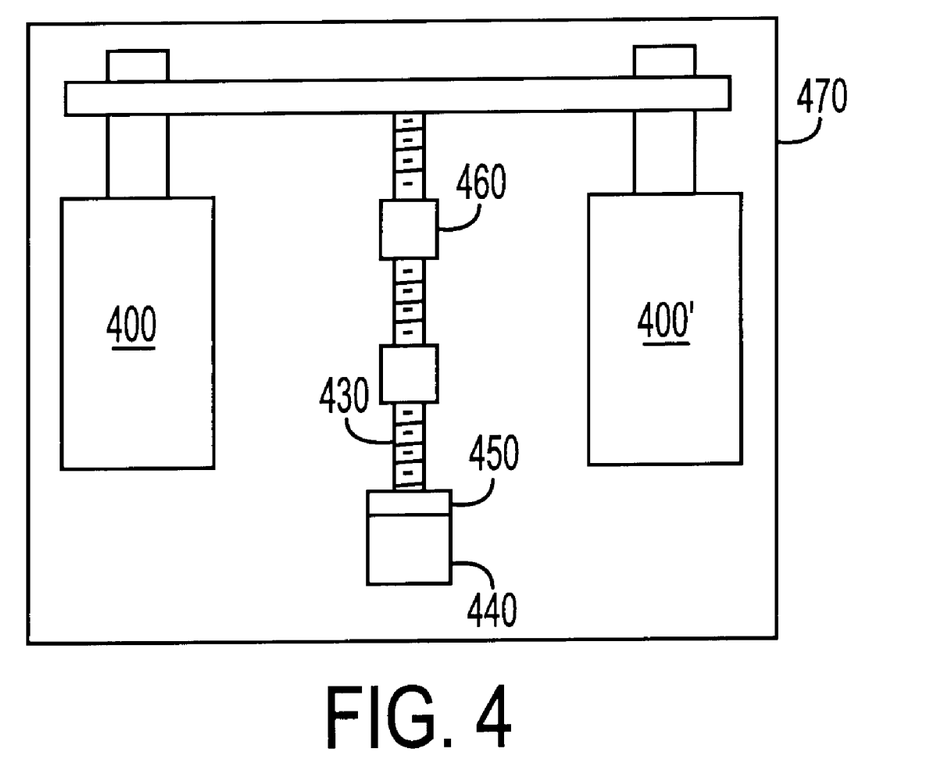
FIG. 4 shows two cameras for capturing 3-dimensional images which have zoom lenses control simultaneously.

FIG. 4 illustrates one mechanism for permitting zoom lenses to zoom in synchronism so that the integrity of the three dimensional resulting image is preserved. Cameras 400 and 400' are each equipped with zoom lenses 410 and 410', respectively. A cross member 420 engages both lenses 410 and 410' in such a way that motion imparted to one is also imparted to the other. Member 420 is driven by either a rack-and-pinion driven arm 430 or by a screw mechanism utilizing servo motor 440 with optional gearbox 450. Thus, when the arm 430 is displaced by the servo motor, zoom lenses 410 and 410' move in synchronism in and out depending on the direction of actuation.

Individual stepping motors can be used to control the zooming of individual lenses. One lens is the master, the other the slave. A combination look up table tells the slave how many steps to move relative to the movement of the master.

Figure 5:
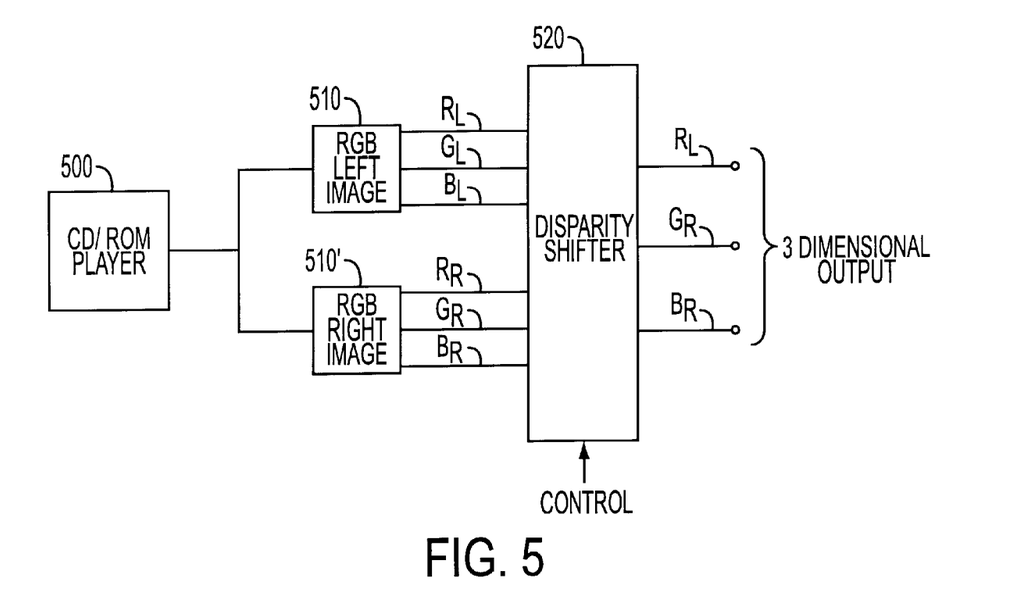
FIG. 5 shows disparity adjustment when displaying right and left static images from a storage medium.

FIG. 5 illustrates an arrangement for displaying three dimensional images which have been stored in storage such as a CD ROM. CD ROM player 500 serves left and right images of a stereo image pair. These are read into respective left and right image buffers 510 and 510'. The images are stored and the image buffers accommodate full color images, typically in 24-bit format with 8 bits of each format constituting, for example, red, green and blue image planes. Image buffers 510 and 510' output their respective image planes to disparity shifter 520. Disparity shifter 520 is described in more detail hereinafter. Again, in keeping with the disclosure of the aforesaid co-pending patent application, the red image plane of the left image is combined with the green and blue image planes of the right image to produce a composite three dimensional image. Disparity shifter 520 allows the left and right image planes to be shifted relative to each other.

Figure 6:
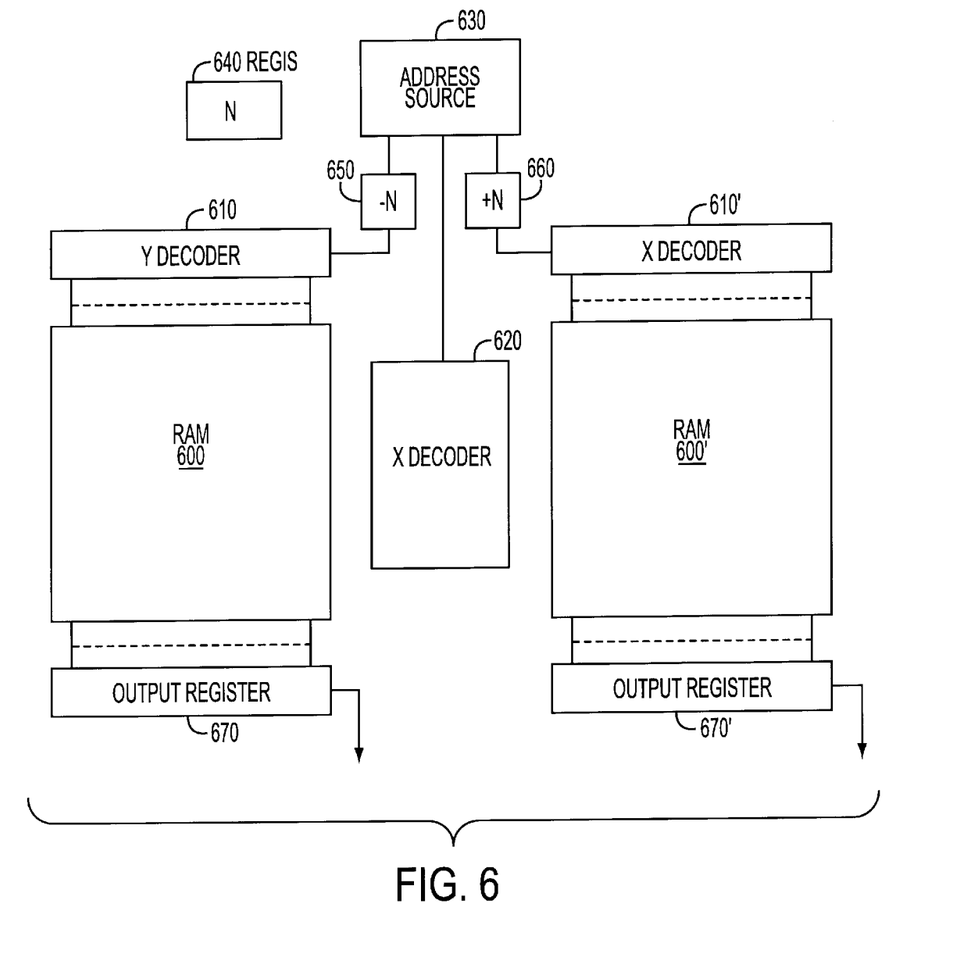
FIG. 6 illustrates a disparity shifter which utilizes address displacement.

FIG. 6 illustrates one form of disparity shifter utilizable with the arrangement of FIG. 5. Random access memory 600 and 600' may either be the actual image storage 510 and 510' of the previous figure or, when live digital images are being received, may constitute separate video RAMS. Once an image is stored in each RAM 600, the data may be read out using X and Y decoders 610, 610' and 620. An address source 630 feeds both the X and Y decoders. A register 640, contains the number "n" which indicates the amount of disparity shift desired for the image plane. Control of the amount of disparity shift can be accomplished by simply changing the value of the variable "n" in register 640. Subtractor 650 and adder 660 respectively subtract and add the value "n" to the column addresses of the Y decoders. As the address source 630 sequences through each line, the columns at the beginning and end will be truncated as shown in FIG. 2.

Figure 7:
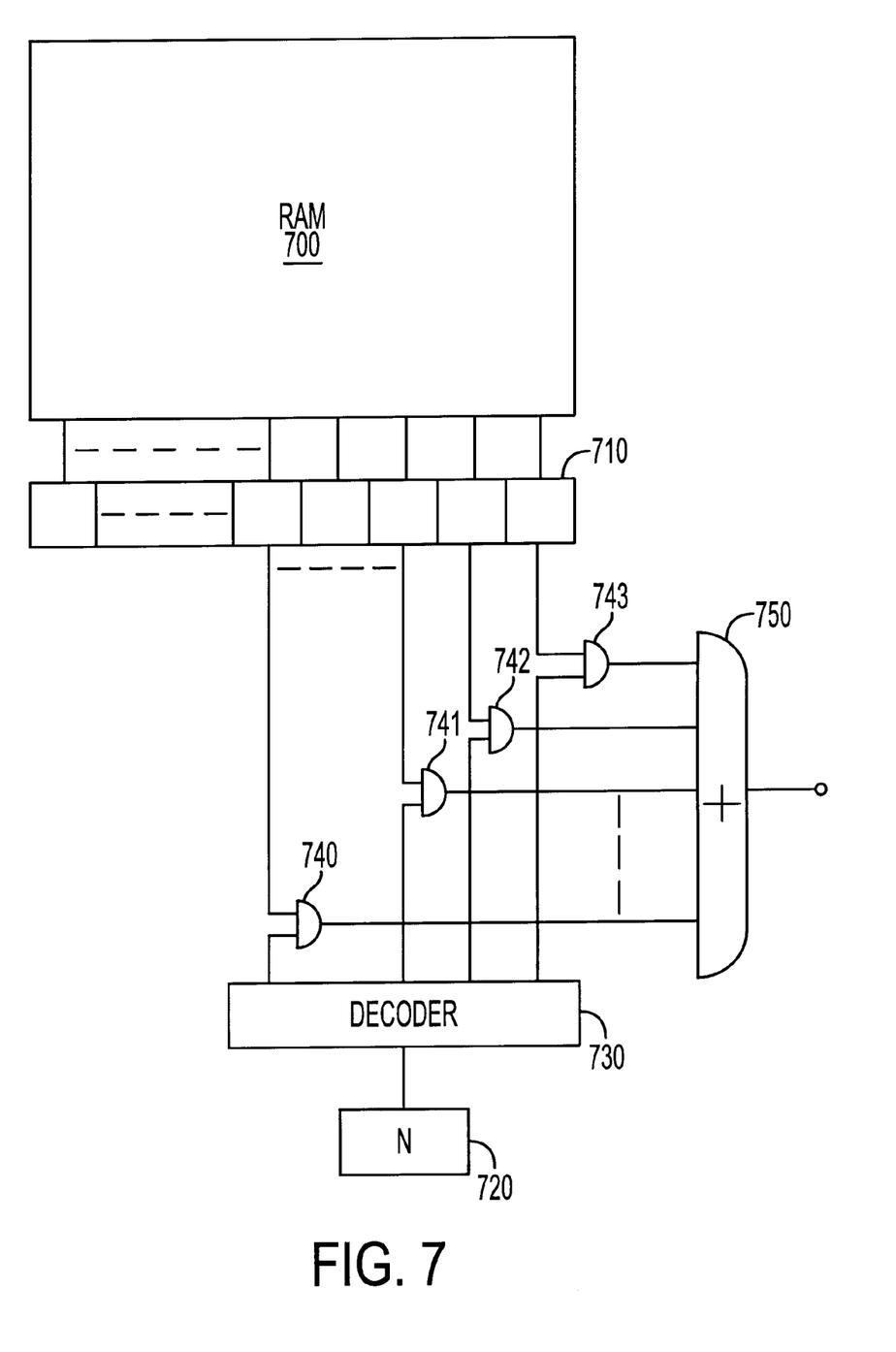
FIG. 7 illustrates another disparity shifter which utilizes a shift register output for selectable output tabs for controlling the cropping of images retrieved from storage.

FIG. 7 shows another method for disparity shifting. The output from video RAM is fed in parallel to a shift register and then the data is clocked to an output port for use. As shown in FIG. 7 by selecting which output cell to take the output from when shifting the shift register's output content to the right one can effectively delete a number of pixels "n" from the output stream. Since this is done line by line the entire image will be truncated on the right end in the version shown. A value "n" is written in register 720 and that value causes decoder 730 to select one of the outputs indicated.

Activation of one of those outputs causes one, and only one, of the and gates, illustrated as 740 through 743 to permit data from the connected cell of the shift register to pass through to or gate 750 where it is passed to the output terminal. To truncate pixels from the other end of the RAM 700, one would add a number of additional shift register cells to the right of the last cell currently shown and utilize the selection gates and procedures described with reference to FIG. 7. In this alternative, a number of shifting clock pulses will be utilized equal to the number of cells in the shift register. Since there are more cells in the shift register than there are clock pulses, the last few cells from the left end of the shift register will not be read out to the output of or gate 750. The shift register is reset prior to loading in the next line of data from RAM 700.

Figure 8:
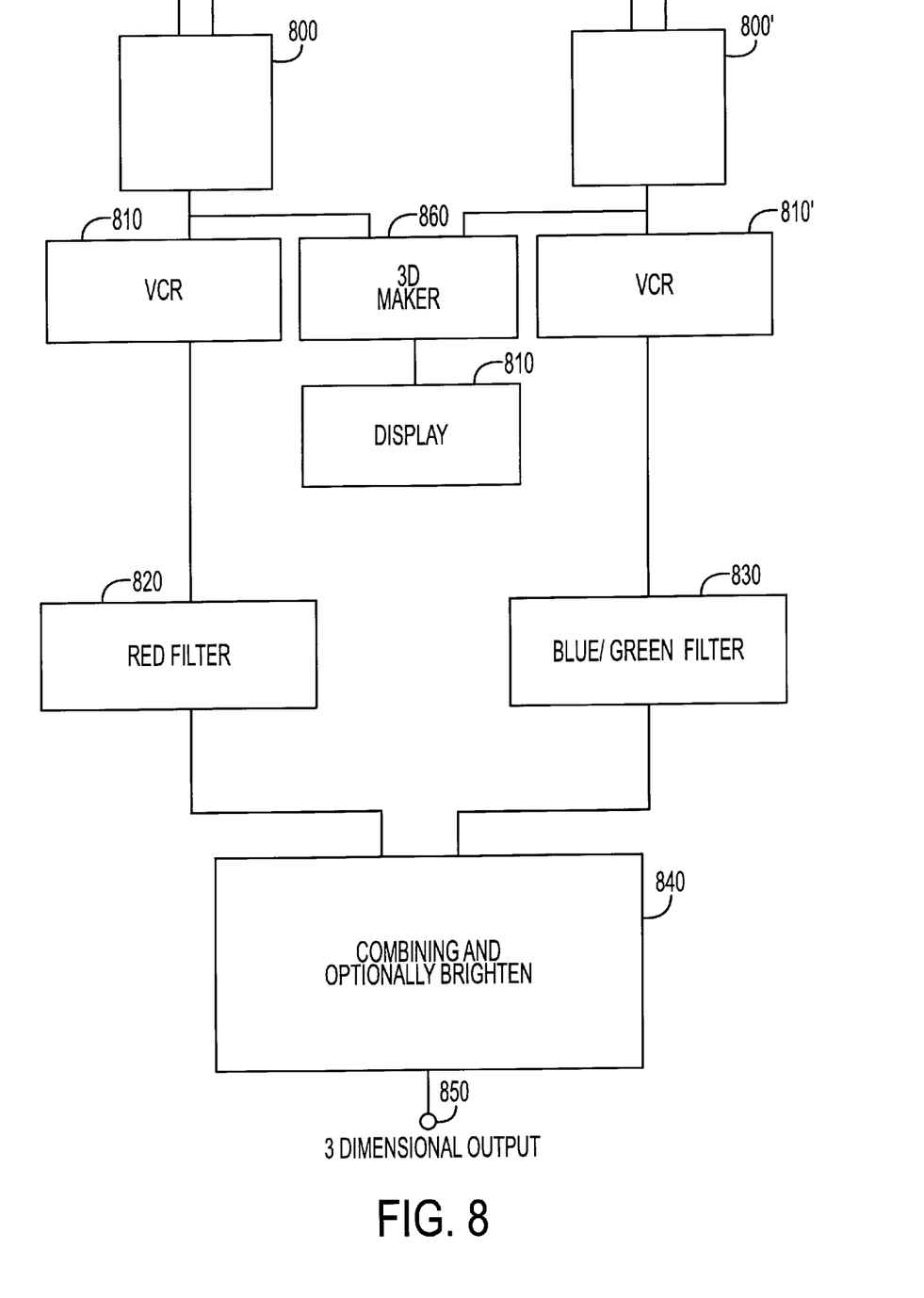
FIG. 8 illustrates methods and apparatus for the capture and reproduction of 3-dimensional images utilizing video cassette recorders.

FIG. 8 illustrates another approach to producing three dimensional images. Analog video cameras 800 and 800' record full color images of a scene on VCRs 810 and 810', respectively. When played back, the output of one of the VCRs is fed to a red filter 820 which extracts red information, and the output of the other VCR is fed to filter 830 which extracts blue/green information. The output of filters 820 and 830 are optionally brightened and combined in a frequency combiner such as an adder, and passed to output terminal 850. In the signal paths described thus far, there is no way for anyone to see the image in real time so as to determine the adequacy of the stereo production. Although a cameraman can view the scene being captured through the viewers of each of cameras 800 and 800', those views are two dimensional. By using a three dimensional image maker, such as that disclosed in the aforesaid co-pending application, the color signals from each of the analog video are converted into individual color planes and the red color plane from the left camera is combined with the green and blue color planes from the right camera to produce a three dimensional image suitable for display on color cathode ray tubes 870. When viewed through viewers, one can see in real time the three dimensional image produced by the camera pair 800 800'.

When capturing live scenes using apparatus such as shown in FIG. 8, it is sometimes necessary to track the distance of an object or person from the cameras. One way of doing this is to place a small, highly reflective material, such as 3M reflective tape, on the target to be tracked. If that target is illuminated with a light source, a highly visible point on the target will appear in the captured image. One can utilize such bright spots created by reflection for calculating target position based on the position of the high intensity target on the screen. Typically, one would monitor the intensity value of the pixels and when a very intense pixel is identified, the address of the pixel would be captured and utilized in a calculation, such as that described in co-pending application Ser. No. 08/318,047 filed Oct. 4, 1994 to determine distance from the cameras to the target. This distance then can be utilized to establish a number of camera parameters such as focus, disparity or zoom.

The presence of such a bright pixel in the output image can be easily detected and removed by routine image processing techniques either on-line or in the post production suite.

Figure 9:
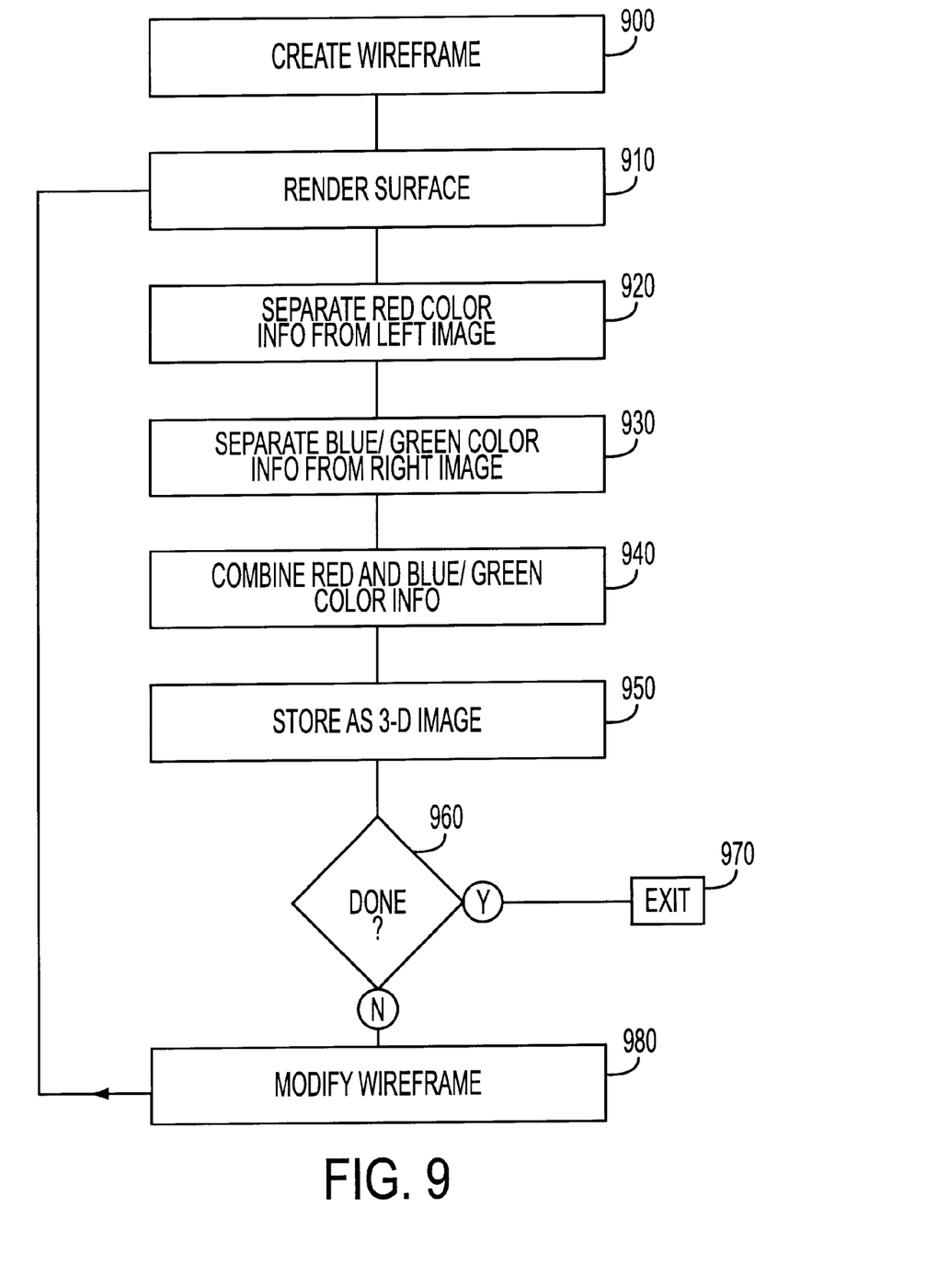
FIG. 9 is a flow chart of how to make a three dimensional computer generated animation.

FIG. 9 is a flow chart of a method for creating three dimensional computer generated animations of an object. First, the object is represented as a three dimensional wire frame (900). Then a surface is rendered on the wire frame (905). Then, two color prospective views of said rendered wire frame are created, one from the position of a first camera and another from the position of a different camera (910). Each prospective view is separated into three color planes (915). Optionally, the disparity between the two views can be controlled so that the object pops out or moves behind the neutral plane (920). One color plane from one of the views is combined with two different color planes from the other view and the combined color planes are stored as three dimensional images (930). The wire frame representation of the three dimensional object is then moved as desired incrementally (935) and steps 905 through 930 are repeated for as many iterations as desired (940). Once sets of three dimensional images are created in this manner, they may be displayed sequentially in rapid succession as part of a three dimensional animation.

Figure 10:
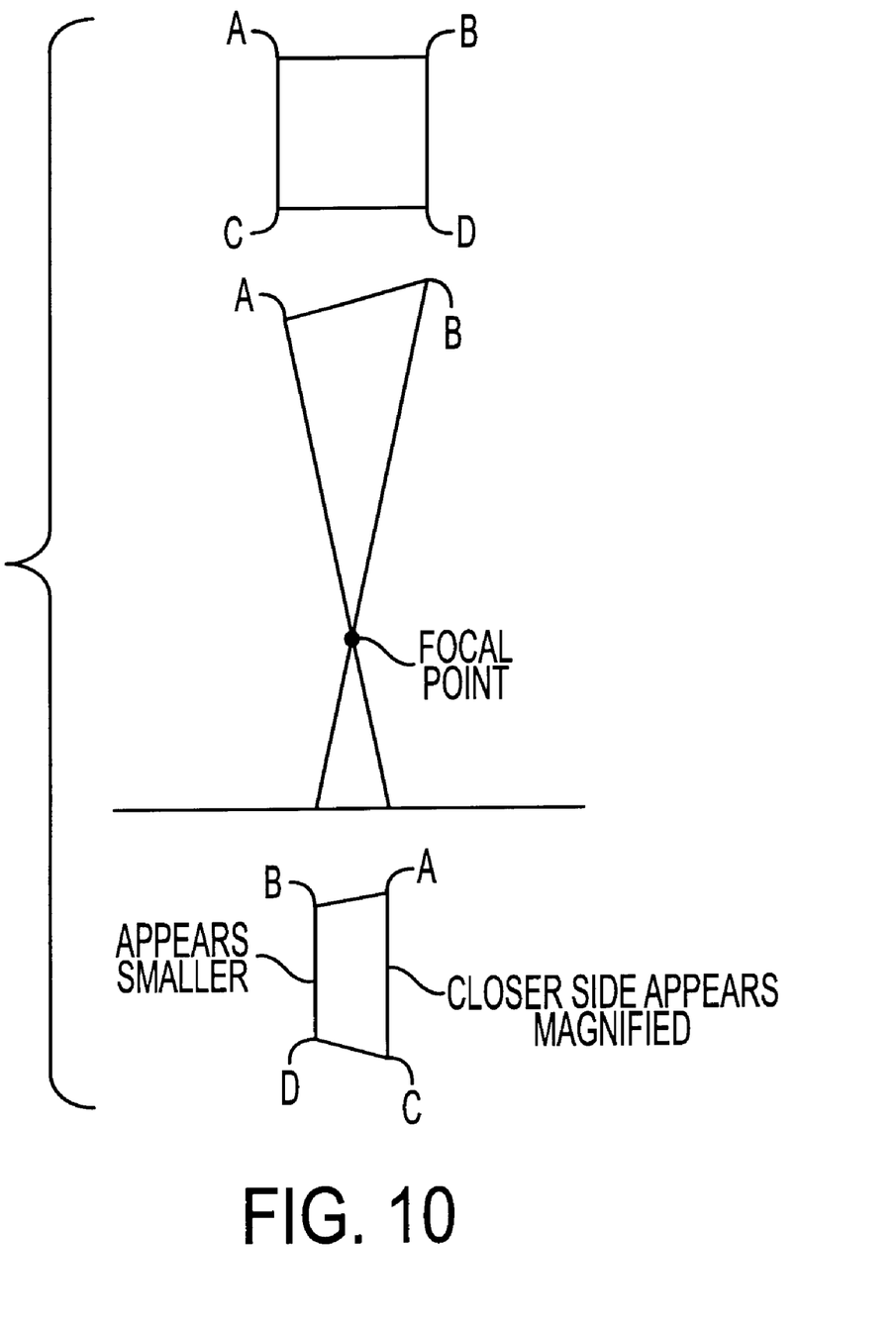
FIG. 10 is an illustration of how camera tilt produces vertical shift in points which would otherwise be at the same vertical position.

FIG. 10 illustrates a vertical shift which occurs when a view of an object is tilted with respect to the camera focal plane. FIG. 10 shows a box ABCD and what happens when the planar surface of ABCD is viewed from an angle such as might occur when the camera focal plane is tilted with respect to the plane of the surface or, as illustrated, when the plane of the surface is tilted with respect to the focal plane. Tracing rays from points A and B through the focal point to the focal plane shows that the image of point B is closer to the center of the focal plane than the image of point A. Since side BD is farther away from the focal point than side AC, side BD appears smaller and size AC appears larger relatively. Thus points A and B which are the same height, appear to be different heights in the image plane.

FIG. 10 shows only one projection but if the same square were projected from two different cameras both toeing in toward the object ABCD, the effect would be even more pronounced because point B on one image would be lower and the same point on the other image would be higher, thus creating a vertical shift between the same point in the left and right views of the stereo image. As the eye tries to adjust to this vertical shift, eye strain often results.

Techniques for compensating for vertical shift are discussed in application Ser. No. 08/481,993 filed Jun. 7, 1995 by the same inventors hereof which application is hereby incorporated herein by reference in its entirety.

Figure 11:
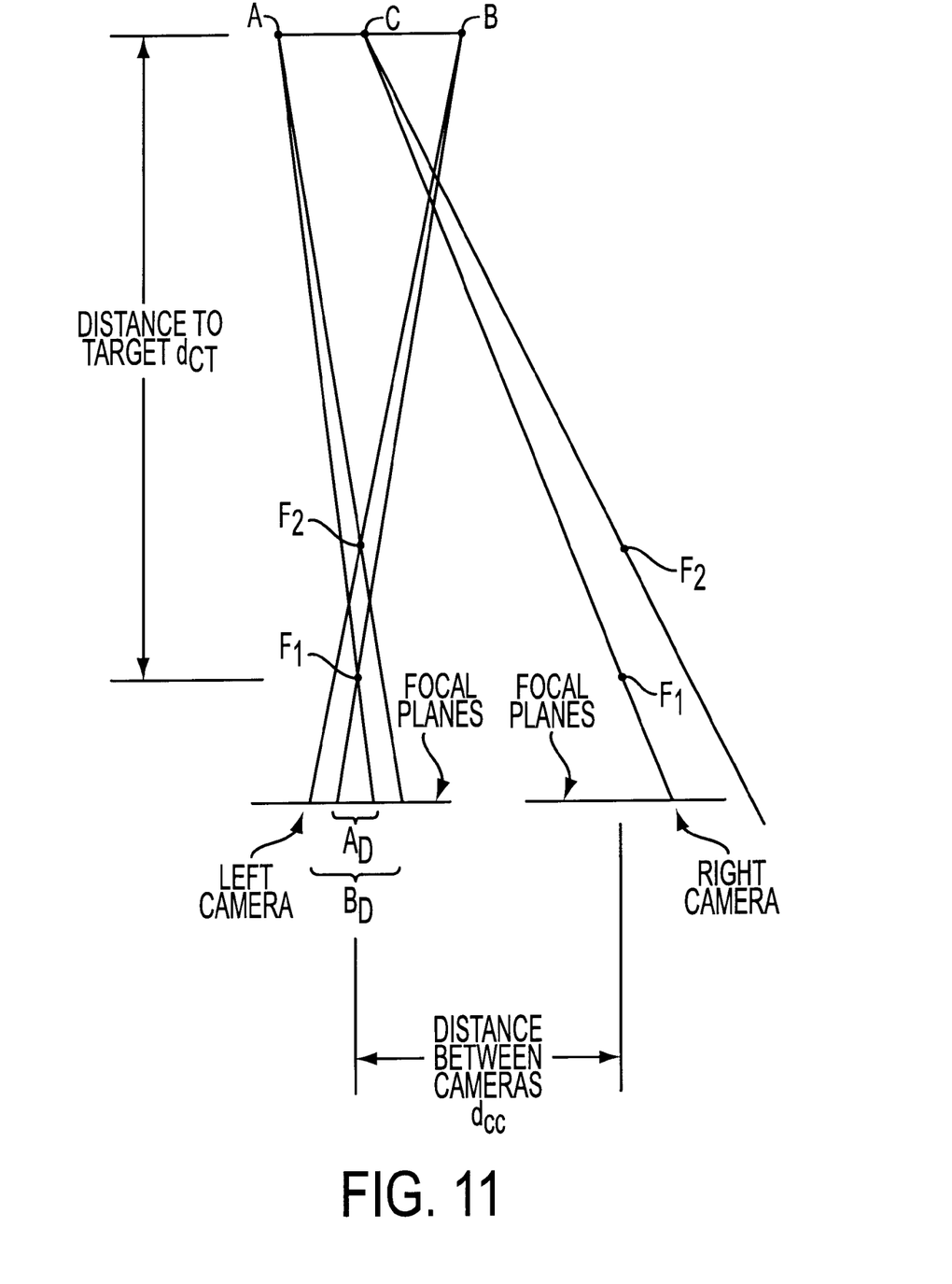
FIG. 11 illustrates the disparity problem resulting from points being different distances from an optical axis and how distance between cameras should be adjusted as a function of target distance in most situations and how disparity should be adjusted concurrently with a change in focal length.

In accordance with the invention, the axes of the two stereo cameras are kept parallel. That is, there is no toe in to compensate for disparity adjustment. However, in accordance with the invention, to avoid a loss of stereo effect, it is preferred, as a matter of default settings that the distance between the cameras be a relatively fixed fraction of the distance to the target. Preferably, the distance between cameras might be approximately $\frac{1}{50}$ of the distance to the target. This can be accomplished by linking the operation of servo 345 of FIG. 3 which controls camera separation with an indication of distance to one target derived from a rangefinder or from autofocus circuitry. Control by a rangefinder or autofocus circuitry can be bypassed by selectively switching out its control signal and by replacing it with a manually generated one. With a $\frac{1}{50}$ relationship, the distance will be neither too great nor too small so as to lose stereo effect. Further, it is desirable to arrange the disparity so that the target distance appears in the neutral plane. FIG. 11 also illustrates that with the change in focal distance, there is a resulting change of scale. As shown in the left side of FIG. 11, the image of line AB through focal point F1 under the focal plane has an extent $A_D$ which is smaller than the image of line $A_B$ through focal point F2 which occupies an extent BD. As expected, the image size increases as focal length of the lens increases. Since line AB is centered on the optical axis of the left camera, the center of the image of line AB is at the same point for both settings of focal length, namely, it is located at the center of the image plane.

However, the image of line AB through focal point F1 of the right camera and focal point F2 of the right camera are considerably displaced from the axis of the camera. Specifically, the image of point C through focal point F2 of the right camera is off the focal plane as shown whereas image of point C through focal point F1 lies barely on the image plane of the right camera. In contrast, corresponding points on the left image plane are comfortably within in the bounds of the image plane.

According to Applicant's invention, when changing focal distance, it is desirable to simultaneously change the disparity to maintain the target in the neutral plane. Thus, as zoom lenses of a pair of cameras are adjusted to simultaneously zoom in on an object at a given distance from the cameras, the disparity shift should be adjusted so that the target remains in the neutral plane. This can be accomplished, for example, by linking control of servo 345 which controls camera separation with servo 440 of FIG. 4 which controls zooming by, for example, use of a look-up table.

In this disclosure, there is shown and described only the preferred embodiment of the invention, but, as aforementioned, it is to be understood that the invention is capable of use in various other combinations and environments and is capable of changes or modifications within the scope of the inventive concepts as expressed herein.

What is claimed is:

1. Apparatus for capturing three dimensional stereo images of a scene comprising:
    a left objective lens and a right objective lens with parallel optical axes,
    means for maintaining spacing between said left objective lens and said right objective lens a fixed fraction of a distance to a targeted object.

2. Apparatus of claim 1 in which the fixed fraction is a default value which can be overridden by manual adjustment.

3. Apparatus for capturing three dimensional stereo images of a scene comprising:
    a left camera and a right camera with substantially parallel optical axes, and each having substantially identical zoom lenses;
    means for adjusting the distance between said optical axes while adjusting focal length of the zoom lenses to hold a location of the neutral plane substantially constant.

4. Apparatus for capturing three dimensional stereo images of a scene comprising:
    a left camera and a right camera having substantially parallel optical axes and substantially identical zoom lenses;
    means for adjusting disparity while adjusting focal length of the zoom lenses to avoid loss of stereo effect.

5. Apparatus for capturing three dimensional stereo images of a scene comprising:
    a left camera and a right camera with parallel optical axes,
    a range finder,
    a control mechanism, connected to said left camera, said right camera and said rangefinder, maintaining spacing between said left camera and said right camera at a fixed fraction of a distance, specified by said rangefinder, to an object.

6. Apparatus for capturing three dimensional stereo images of a scene comprising:
    a left camera and a right camera with substantially parallel optical axes, and each having substantially identical zoom lenses;
    a control mechanism which adjusts disparity while adjusting focal length of the zoom lenses to hold a location of the neutral plane substantially constant.

7. Apparatus for capturing three dimensional stereo images of a scene comprising:
    a left camera and a right camera; and
    a control mechanism which adjusts disparity to hold a location of the neutral plane substantially constant when the distance of the camera to the scene changes.

8. A method for capturing three dimensional stereo images of a scene comprising the steps of:
    obtaining a left camera and a right camera having substantially parallel optical axes, and
    maintaining spacing between said left camera and said right camera at a fixed fraction of a distance to a targeted object.

9. The method of claim 8 in which the fixed fraction is a default value which can be overridden by manual adjustment.

10. The method of claim 8 in which the fixed fraction is 1/50.

11. A method for capturing three dimensional stereo images of a scene comprising the steps of:
    obtaining a left camera and a right camera having substantially parallel optical axes and substantially identical zoom lenses; and
    adjusting camera separation while adjusting the zoom lenses to hold a location of the neutral plane substantially constant.

12. A method for capturing three dimensional stereo images of a scene comprising the steps of:
    obtaining a left camera and a right camera having substantially parallel optical axes and substantially identical zoom lenses; and
    adjusting disparity while adjusting focal length of the zoom lenses to avoid loss of stereo effect.

13. A method for capturing three dimensional stereo images of a scene comprising the step of:
    using a left camera and a right camera with parallel optical axes and a range finder, maintaining spacing between said left camera and said right camera at a fixed fraction of a distance, specified by said rangefinder, to an object.

14. A method for capturing three dimensional stereo images of a scene comprising the step of:
    using a left camera and a right camera with substantially parallel optical axes and each having substantially identical zoom lenses, adjusting disparity while adjusting focal length of the zoom lenses to hold a location of the neutral plane substantially constant.

15. A method for capturing three dimensional stereo images of a scene comprising the step of:
    using a left objective lens and a right objective lens, adjusting the effective distance between the optical axes of the objective lenses to hold a location of the neutral plane substantially constant when the distance of the objective lenses to the scene changes.

* * * * *